United States Patent [19]
Wright et al.

[11] 3,846,061
[45] Nov. 5, 1974

[54] FLAME-DETECTION CIRCUITS

[75] Inventors: Maurice James Wright, Birmingham; Charles Peter Cockshott, Coventry, both of England

[73] Assignee: Lucas Aerospace Limited, Birmingham, England

[22] Filed: Mar. 22, 1973

[21] Appl. No.: 344,031

[30] Foreign Application Priority Data
Mar. 25, 1972 Great Britain.................... 14116/72

[52] U.S. Cl.................... 431/79, 328/2, 340/228.2, 250/211
[51] Int. Cl............................................. F23n 5/08
[58] Field of Search........ 431/79; 340/228.2; 328/2; 250/211

[56] References Cited
UNITED STATES PATENTS

| | | | |
|---|---|---|---|
| 3,304,989 | 2/1967 | Alexander et al. | 431/79 X |
| 3,510,237 | 5/1970 | Granieri | 431/79 |
| 3,583,844 | 6/1971 | Smith, Jr. | 431/79 |
| 3,651,327 | 3/1972 | Thomson | 431/79 X |

Primary Examiner—Edward G. Favors
Attorney, Agent, or Firm—Holman & Stern

[57] ABSTRACT

A flame-detection circuit for a gas turbine engine has a photo-voltaic source for monitoring the flame and a control network which when energised initiates ignition. The source is coupled to the control network by way of an ac., amplifier and the flicker of the flame produces a signal which is amplified to hold the control network deenergised.

7 Claims, 1 Drawing Figure

PATENTED NOV 5 1974 3,846,061
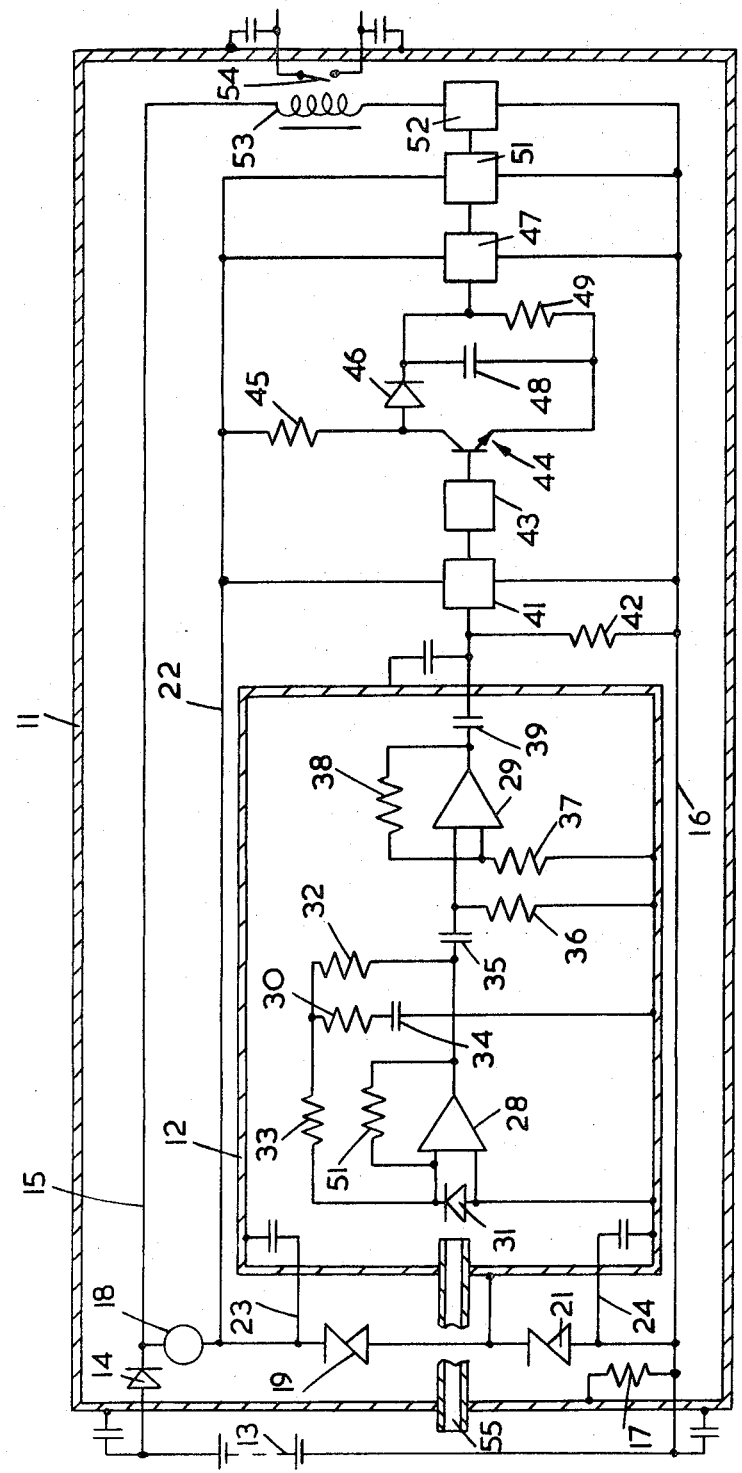

FLAME-DETECTION CIRCUITS

This invention relates to flame detection circuits for use with gas turbine engines.

A circuit according to one aspect of the invention comprises a photovoltaic source for monitoring the flame, a control network which when energised initiates ignition, and an a.c. amplifier coupling said source to the control network, the flicker of the flame producing in said source a signal which is amplified and used to hold the control network de-energised.

A circuit according to another aspect of the invention comprises a flame detection circuit comprising a photo-voltaic source for detecting a flame, a control network which when energised gives a warning or effects a control and an a.c. amplifier coupling said source to the control network, the flicker of the flame producing in said source a signal which is amplified and used to energise the control network.

The term "photo-voltaic source" is used to mean a source which produces an electrical signal when it is exposed to light, as distinct from a photo-sensitive device which produces an electrical signal which is modified when the device is exposed to light. It will of course be appreciated that some devices can be used in either mode, either as a photo-voltaic source or as a device having characteristics which are modified by light. Such a device is a photo-diode, which is used in the preferred embodiment, but as a photo-voltaic source. The reason for using a photo-voltaic source is that the source is then not affected by signals on the supply lines which would be needed for a device the characteristics of which are simply modified by light, and the signal output is less prone to variations due to change in temperature.

In the preferred embodiment, the amplifier is an operational amplifier having a feed-back which is substantially less for d.c. inputs than for a.c. inputs.

Where the ignition circuit is being controlled, then preferably a first delay network is incorporated whereby the ignition circuit is not actuated until the flame has been absent for a predetermined length of time. A second delay circuit may also be incorporated whereby the ignition circuit remains energised for a predetermined time after the flame has been re-established. In the preferred arrangement, the same capacitor is used in both delay circuits, but with a different resistor for determining the length of the two delays respectively.

The accompanying drawing is a circuit diagram, partly in block form, illustrating one example of the invention.

Referring to the drawing, there is provided an outer metallic enclosure 11 within which the entire circuit is housed, and an inner metallic enclosure 12 within the enclosure 11 and within which are contained those components in the circuit which require a high degree of shielding from external a.c. interference signals. All electrical connections to components within the enclosures are made through conventional capacitive couplings as shown. The power for the system is provided by a battery 13 on the aircraft, the battery 13 having its positive terminal connected through a diode 14 to a supply line 15 and its negative terminal connected to a supply line 16 which is connected through a resistor 17 to the casing 11, so that if the casing 11 is insulated from the aircraft metalwork the enclosure 11 will be at the same potential as the negative battery terminal. However, if the enclosure 11 is mounted on metalwork of the engine or aircraft, it can assume the same potential as the metalwork. In both cases, this reduces interference effects. The lines 15 and 16 are interconnected by a series circuit including a constant current source 18 and a pair of Zener diodes 19 and 21. The junction of the constant current source 18 and the Zener diode 19 is connected to a positive supply line 22, and is also connected to a further positive supply line 23 which together with the supply line 24 connected to the line 16 feeds components within the enclosure 12. The junction of the Zener diodes 19 and 21 is connected to the enclosure 12, so that the enclosure 12 is maintained at a stabilised potential with respect to the battery negative line and the photo diode potential.

Within the enclosure 12 are a pair of operational amplifiers 28, 29 each of which is connected between lines 23 and 24. One input terminal of the amplifier 28 is connected to the enclosure 12, and its other input terminal is connected to the enclosure 12 through a photo-sensitive diode 31. The output terminal of the operational amplifier 28 is connected to said other input terminal through a pair of resistors 32 and 33 in series, and the junction of the resistors 32 and 33 is connected through a resistor 30 and a capacitor 34 in series to the enclosure 12. Moreover, the output terminal of the amplifier 28 is connected to the enclosure 12 through a capacitor 35 and a resistor 36 in series, and the junction of the capacitor 35 and resistor 36 is connected to one input terminal of the amplifier 29, the other input terminal of the amplifier 29 being connected through a resistor 37 to the enclosure 12. The output terminal of the amplifier 29 is connected through a resistor 38 to said other input terminal of the amplifier 29, and is also connected through a capacitor 39 within the enclosure to the input terminal of an a.c. amplitude detector 41 which is positioned externally of the enclosure 12 but within the enclosure 11. The detector 41 is connected to the lines 22 and 16, and has its input terminal connected through a resistor 42 to the line 16. The output from the detector 41 is fed through a rectifier 43 to the base of an n-p-n transistor 44, the collector of which is connected through a resistor 45 to the line 22 and the emitter of which is connected to the line 16. The collector of the transistor 44 is connected through a diode 46 to the input terminal of an amplifier 47 having a high input impedance, the amplifier 47 being connected between the lines 22 and 16, and having its input terminal connected to the line 16 through a capacitor 48 and a resistor 49 in parallel. The output from the amplifier 47 is fed through a Schmitt trigger circuit 51 connected between the lines 22 and 16, and the output from the Schmitt trigger circuit 51 is connected to an output stage 52 connected between the lines 15 and 16 in series with a relay coil 53 which when de-energised opens a contact 54 which allows the ignition system of the aircraft to operate.

The diode 31 is illuminated by way of a light conducting pipe 55 which extends through the enclosure 12 and the enclosure 11 and receives light from the combustion chamber of the aircraft.

Assuming that the aircraft engine is operating satisfactorily, then light is received by the diode 31, which provides an a.c. input to the amplifier 28 which is amplified, further amplified by the amplifier 29, and fed to the detector 41. As the diode 31 is illuminated, the amplitude of the a.c. signal is sufficient to cause the detector 41 to produce an output which is rectified and turns on the transistor 44, so that no current flows through the diode 46 to the amplifier 47, which, in this state produces an output to hold the trigger circuit 51 in a state in which an output is provided to the output stage 52 to energise relay 53 and so close contact 54 to prevent operation of the ignition circuit.

If the flame is extinguished, then of course the diode 31 is no longer illuminated and the detector 41 ceases to produce an output so that the transistor 44 turns off. After a delay during which the capacitor 48 charges through the resistor 45, the amplifier 47 ceases to produce an output so that the trigger circuit 51 assumes its alternative state, in which the output state produces no output to energise the coil 53 and so opens the contact 54, so that the ignition circuit of the engine can operate. Assuming that the ignition circuit successfully restarts the engine, then the diode 31 is illuminated again and the detector 41 produces an output turning on the transistor 44. There is now a further delay while the capacitor 48 discharges through the resistor 49, but after this delay the amplifier 47 produces an output to switch the trigger circuit 51 and energise the relay coil 53. The first delay in a typical arrangement is of the order of 50 milliseconds, but the second delay is considerably longer, for example 10 seconds, so that the ignition circuit remains energised for sometime after the flame re-appears.

It will be seen that the great majority of faults e.g., open circuit of input leads, open circuit of output leads, disconnection of light pipe, failure of a.c. signal, lead to the ignition circuit switching on which is preferred from fail to safety considerations.

It will be appreciated that the feedback within the amplifier 28 is frequency sensitive by virtue of the capacitor 34. There are two basic types of flame which appear in a combustion chamber, a yellow flame and a blue flame. If an amplifier is used which has a gain which is satisfactory for the blue flame, then if the same amplifier is employed when a yellow flame appears, the circuit is overloaded by the large d.c. content of the signal and overloading results and prevents an a.c. output being produced. Using the amplifier 28 of the form shown, then since the feedback is substantially less for the d.c. signal, no overloading occurs at high a.c. gain and so this difficulty is overcome.

A further improvement of dynamic range of input currents which can be accommodated results from the addition of a voltage dependent resistor 51 (or network) from the output terminal of amplifier 28 to the cathode of diode 31. This has the effect of decreasing the effective gain of the amplifier at higher signal, i.e., a form of automatic gain control.

In another example, the arrangement is used as a flame detection circuit. The control network is normally de-energised, and when a flame is present, the flicker produces a signal in the manner described above, this signal being amplified and used to energise the control network, which gives a warning and/or effects a control by operating one or more extinguishing devices. The delay arrangements are not needed in this example, but it may be desirable in some cases to incorporate before the Schmitt trigger circuit a filter to remove a.c. components at the order of 100 $H_2$ which may be received from, for example, mains operated lamps.

We claim:

1. A flame-out detection circuit for use with gas turbine engines, comprising a photo-voltaic source for monitoring the flame, a control network which when energised initiates ignition, and an a.c. amplifier coupling said source to the control network, the flicker of the flame producing in said source an a.c. signal which is amplified and used to hold the control network de-energised.

2. A circuit as claimed in claim 1 wherein said control network incorporates a first delay network, said first delay network operating upon receipt of a signal from said a.c. amplifier to prevent energisation of said control circuit for a predetermined length of time, whereby the ignition circuit is not actuated until the flame has been absent for said predetermined length of time.

3. A circuit as claimed in claim 2 in which said control network includes a second delay circuit, said second delay circuit serving when said a.c. amplifier ceases to provide an input to the control network to hold said control network energised for a predetermined time, whereby the ignition circuit remains energised for said predetermined time after the flame has been re-established.

4. A circuit as claimed in claim 3 in which said first delay network comprises a resistor in series with a capacitor, said resistor determining said predetermined length of time, and said second delay circuit including a further resistor in series with the same capacitor, said further resistor determining said predetermined time.

5. A flame detection circuit comprising a photo-voltaic source for detecting a flame, a control network which when energised gives a warning or effects a control and an a.c. amplifier coupling said source to the control network, the flicker of the flame producing in said source a signal which is amplified and used to energise the control network.

6. A circuit as claimed in claim 1 in which the amplifier is an operational amplifier having a feedback which is substantially less for d.c. inputs than for a.c. inputs.

7. A circuit as claimed in claim 1 in which a photo-diode is used as the photo-voltaic source.

* * * * *